Sept. 22, 1970     C. L. BAUER     3,529,440
FLEXIBLE COUPLING
Filed Jan. 10, 1969
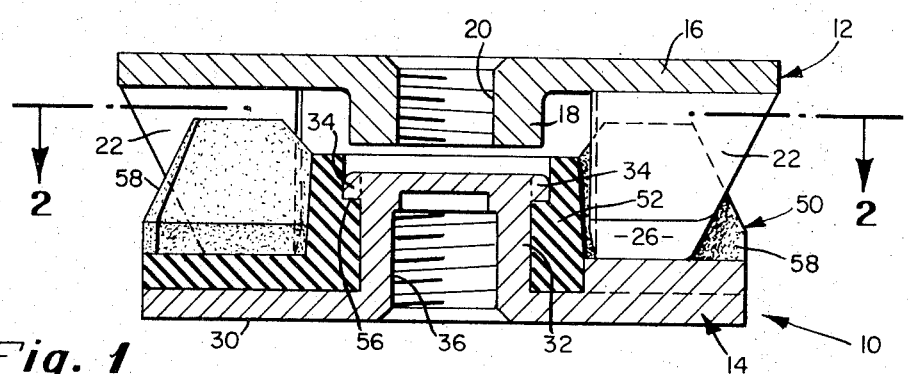
Fig. 1
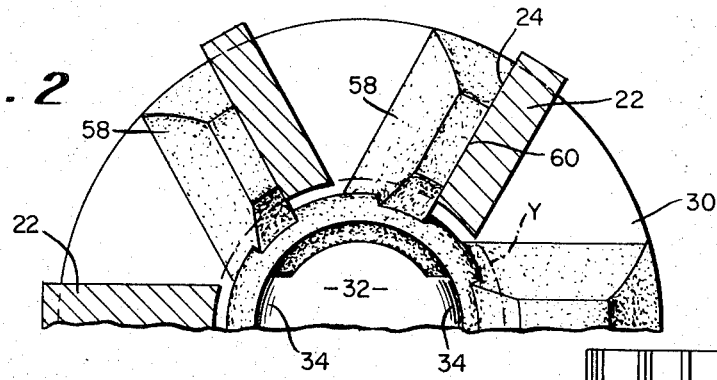
Fig. 2
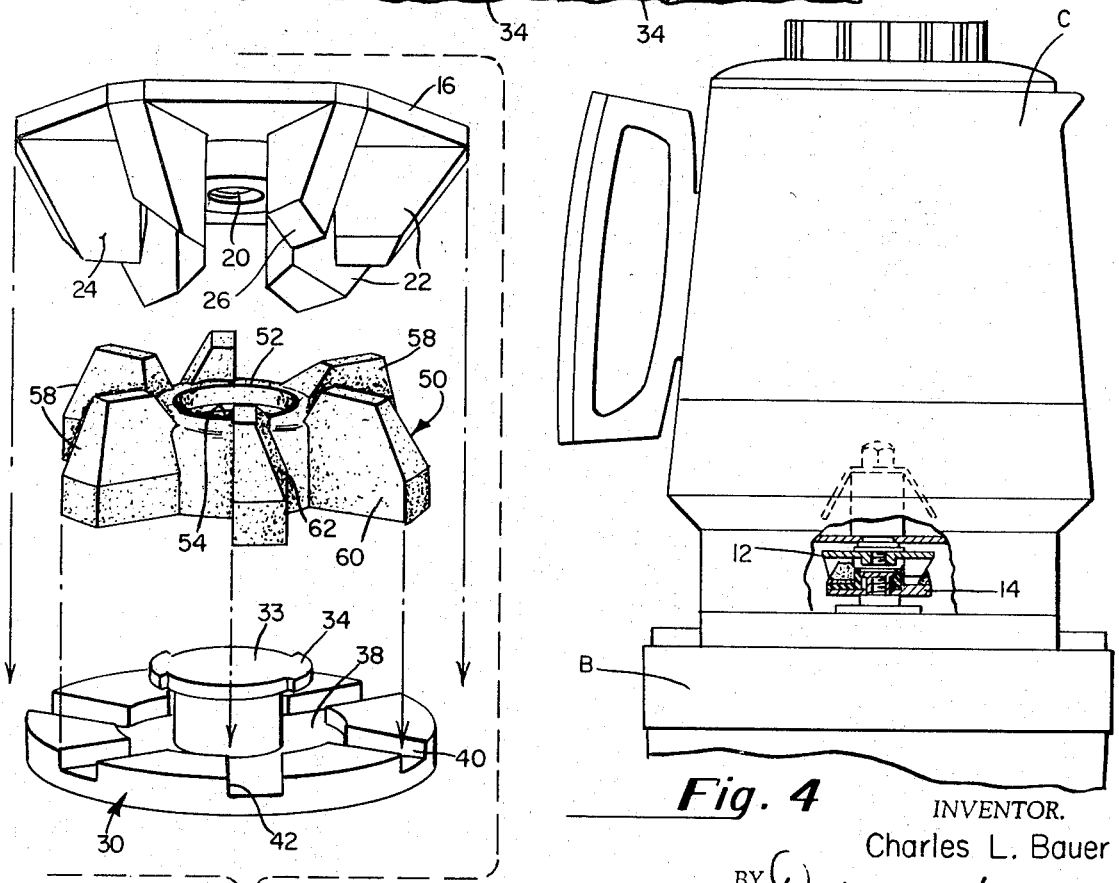
Fig. 3
Fig. 4
INVENTOR.
Charles L. Bauer
BY Hallett Hoopes
ATTORNEY.

ns Patent Office
3,529,440
Patented Sept. 22, 1970

1

3,529,440
FLEXIBLE COUPLING
Charles L. Bauer, Cheshire, Conn., assignor to Scovill Manufacturing Company, Waterbury, Conn., a corporation of Connecticut
Filed Jan. 10, 1969, Ser. No. 790,358
Int. Cl. F16d 3/68
U.S. Cl. 64—14                    2 Claims

ABSTRACT OF THE DISCLOSURE

A separable flexible coupling especially for kitchen mixers comprises an upper and lower element. The lower element has a rigid base disc with a central rigid post, and a rubber insert, comprising a hub surrounding the post and spoke-like fingers, fits against the disc with the lower ends of the rubber part engaging in suitable channels in the disc base. In operation, the rubber hub expands outwardly to engage the teeth of the upper member to reduce vibration.

---

This invention relates to a flexible coupling which is especially well adapted for use in a kitchen food blender of the type in which the food container is separable from the power base.

In the past, couplings for kitchen blenders have included resilient elements capable of damping some of the vibrations developed between the drive motor and the blender agitator. One such coupling is shown in Pat. 2,755,900 assigned to my assignee. This coupling includes a coupling member on the end of both agitator shaft and drive shaft. Each member comprises a plate facing the plate on the other member and having longitudinally extending teeth arranged in spoke-like array on the plate. The teeth of one of the members are of resilient material such as rubber and bonded to the coupling member plate. The teeth of the two members intermesh in a driving connection.

The present invention is an improvement on the coupling of the above-mentioned patent and involves the structure of the rubber-toothed coupling member. Under the invention, the bonding of the teeth to the plate is made unnecessary by an interfitting construction of parts. The bonding technique has been an expensive procedure and the advantage of the invention is therefore clear.

Additionally, structure embodying the present invention has the advantage of improved damping characteristics and severe better to attenuate and lessen the vibrations generated as the blender or other device is in use. It is well known that certain vibration problems are inherent in the use of separable couplings since the connected shafts are never in exact axial alignment. There is hence a constantly changing uneven distribution of load as the coupling rotates. The vibrations thus caused wear out bearings and generate noise. The present coupling reduces this.

Further advantages and objects of the invention will be apparent from the following specification and the drawings in which an embodiment of the invention is disclosed.

FIG. 1 is a sectional view through the center line of a coupling embodying the invention;

FIG. 2 is a half sectional view taken on the line 2—2 of FIG. 1;

FIG. 3 is a perspective exploded view showing the parts of the coupling disassembled and slightly reduced; and FIG. 4 is a side elevation of a kitchen blender including such a coupling, the view being reduced and broken away to expose the coupling in section.

Referring more specifically to the drawings, a flexible coupling embodying the invention is shown in FIG. 1 and

2 generally designated at 10. It comprises an upper coupling member 12 and a lower coupling member 14.

Coupling member 12 comprises a circular plate 16 of rigid material such as aluminum formed with a central downward boss 18. Coupling 12 is apertured at 20 on its axis and the aperture is threaded and chamfered as shown to threadedly engage the lower end of the agitator shaft. Spaced outward from the boss 18 are integrally formed spaced radial teeth 22 which extend downwardly from the disc. The trailing or contact face 24 (FIG. 2) of each of the teeth is disposed in a plane radial to the axis of the coupling member 12 for reasons which will appear. As shown, the distal end of each tooth is inclined toward the trailing face 24 as at 26. This assists in the intermeshing of the teeth of the coupling members as the coupling is put into operative position.

The lower coupling member 14 comprises a disc or circular plate 30 somewhat thicker than the plate 16 and includes an integral central upstanding post 32. The plate including the post is of rigid material such as aluminum. The top of the post is formed with a pair of diametrically opposed outward ears 34 which comprise an outward flange position. The plate is formed with an upward axial bore 36 which is threaded and chamfered as shown. It may thus be threadedly attached to the upper end of the drive shaft.

As best shown in FIG. 3, the plate of the lower coupling member is formed with an annular channel 38 surrounding the post Radiating outward from the channel 38 are spoke-like channels 40 in the version shown of the same depth as the channel 38. The leading edge of each of the spoke-like channels is disposed in plante radial to the axis of the lower coupling member 14.

The lower coupling member 14 is completed by a resilient insert element 50 which is integrally molded of rubber or the like. The element 50 comprises a central hub 52 which has an axial opening 54. The opening is enlarged at its upper end to present an upwardly facing shoulder or ledge 56. Extending outward from the hub are the resilient teeth 58. Each of these is disposed with its leading or contact face 60 in a radial plane and the rear face is tapered as at 62 to assist in guiding the coupling members together as they are intermeshed.

In assembly, the resilient element 50 is simply forced down over the ears 34 onto the post 32. The lower portion of the teeth 58 fit respectively into the spoke-like channels 40 and the lower end of the hub 52 bottoms out on the floor of the channel 38. Being resilient, the hub snugly engages the post 32 and the ears 34 engage the ledge 56 of the hub to hold the two elements together.

By virtue of interlocking construction of elements 30 and 50, no bonding of the resilient and metallic parts is necessary. Further, if for any reason it is desired to replace the resilient element 50 it may be readily pried off the rigid element 30. Because it is not necessary to bond parts together, the construction of the present invention is much less expensive than former couplings.

FIG. 4 shows the coupling as installed on a blender. The blender container C sits on the power base B and the lower coupling member on the upper end of the drive shaft interfits with the upper coupling member 12 on the lower end of the agitator shaft.

A specific advantage of the structure of the present invention is that because the resilent hub 52 is not bonded to the boss 32 it may move outward and expand under centrifugal force when the coupling is in operation. This causes it to frictionally engage the inward end of each of the metal teeth 22 of the upper coupling member as shown by the phantom line Y in FIG. 2. This contact further dampens vibrations as described by causing the rubber hub of the element 50 to absorb a portion of the change in tooth loading as the coupling rotates. The hub also serves to hold the contact faces of the coupling more or less in continuous contact and prevents, or at least reduces, the rotary "bouncing" action of the driven teeth against the driving teeth.

The invention can be defined by the following claim language.

I claim:

1. A flexible coupling for drivingly connecting a pair of separable shafts comprising a coupling member fixed on each of the said shafts, at least one of said members comprising (a) a rigid disc having a substantially cylindrical upstanding central post having an outwardly extending flange portion adjacent the upper end thereof, the disc being formed with an annular channel surrounding said upstanding post and outward spoke-like channels extending out from said surrounding channel; and (b) an integral molded relatively flexible insert comprising a hub having a central opening, the hub snugly surrounding the post and held down by the flange portion with the lower end of the hub in the annular channel, teeth radiating outwardly from the hub, the lower ends of the teeth disposed snugly in the spoke-like channels respectively, the contact face of each of the teeth being substantially radial of the axis of the disc, the other of said coupling members comprising teeth extending into the openings between the teeth of said one member, the teeth on said other member having radial contact faces engaging respectively the contact faces on the teeth on the first member to provide maximum tooth contact.

2. A coupling as described in claim 1 wherein the teeth on the said other member have inward end positions facing the hub and the outer periphery of the hub is dimensioned to not engage the end portions when the coupling is at rest and to expand outward to frictionally engage the end portions when the coupling is in operation, such engagement serving to dampen the vibrations inherent in operation.

References Cited

UNITED STATES PATENTS

| 2,716,334 | 8/1955 | Scott | 64—14 |
| 2,755,900 | 7/1956 | Seyfried | 64—11 XR |
| 2,992,715 | 7/1961 | Blachly | 64—27 XR |
| 3,064,949 | 11/1962 | Deventer | 64—14 XR |
| 3,257,827 | 6/1966 | Hughes | 64—14 XR |

JAMES A. WONG, Primary Examiner

U.S. Cl. X.R.

64—27